(12) United States Patent
Bluzer et al.

(10) Patent No.: US 7,361,900 B2
(45) Date of Patent: Apr. 22, 2008

(54) "I" BEAM BRIDGE INTERCONNECTION FOR ULTRA-SENSITIVE SILICON SENSOR

(75) Inventors: Nathan Bluzer, Rockville, MD (US); James Halvis, Severna Park, MD (US); Robert Shiskowski, Sykesville, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 64 days.

(21) Appl. No.: 11/302,229

(22) Filed: Dec. 14, 2005

(65) Prior Publication Data

US 2007/0131861 A1    Jun. 14, 2007

(51) Int. Cl.
*G01J 5/00* (2006.01)
(52) U.S. Cl. .................................... 250/338.1
(58) Field of Classification Search .............. 250/338.1
See application file for complete search history.

(56) References Cited

U.S. PATENT DOCUMENTS

| | | | |
|---|---|---|---|
| 6,341,039 B1 * | 1/2002 | Flanders et al. ............ 359/578 |
| 6,489,615 B2 | 12/2002 | Bluzer |
| 6,632,698 B2 * | 10/2003 | Ives .............................. 438/52 |
| 6,956,213 B2 * | 10/2005 | Antesberger ............. 250/338.1 |
| 7,102,472 B1 * | 9/2006 | Nathanson et al. ............ 335/78 |
| 2004/0232336 A1 * | 11/2004 | Antesberger ............. 250/338.1 |
| 2005/0087687 A1 | 4/2005 | Bluzer |
| 2005/0173770 A1 * | 8/2005 | Linden et al. ............... 257/414 |

FOREIGN PATENT DOCUMENTS

EP    1 122 526 A2    8/2001

* cited by examiner

*Primary Examiner*—Constantine Hannaher
(74) *Attorney, Agent, or Firm*—Andrews Kurth LLP

(57) ABSTRACT

A bolometer type focal plane is made up of a plurality of silicon sensors. Within each sensor, interconnection between co-planar stages is provided by elongated "I" beam type bridge members having a generally rectangular cross-section including unequal wider (height) and narrower (width) dimensions, and wherein the bridge members are oriented such that the narrower width dimension is in the direction of the common plane and the wider height dimension is perpendicular to the common plane. A sensor with these bridges accommodates stress/strain by rotation while preventing out-of-plane deflection and deformation.

19 Claims, 2 Drawing Sheets

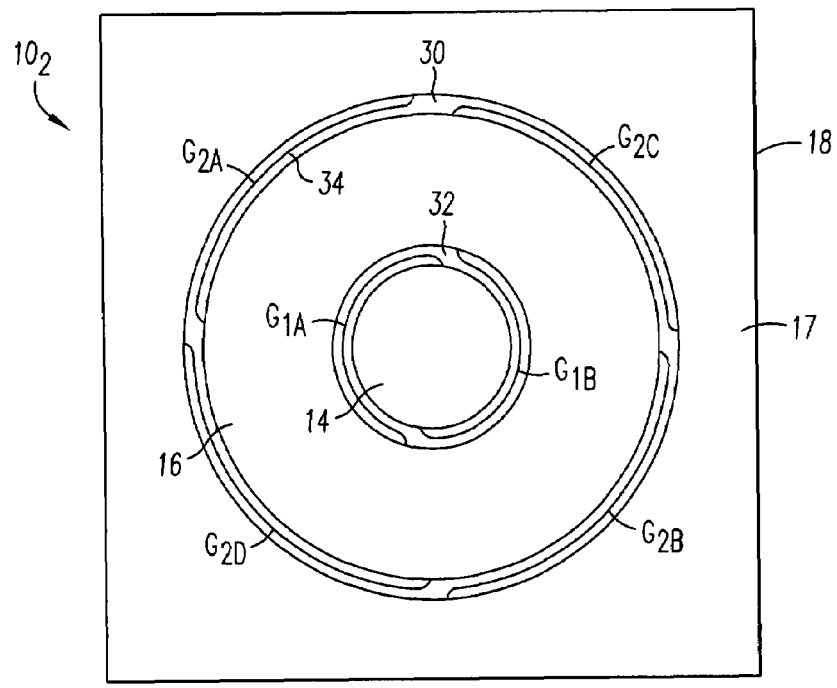
FIG.3
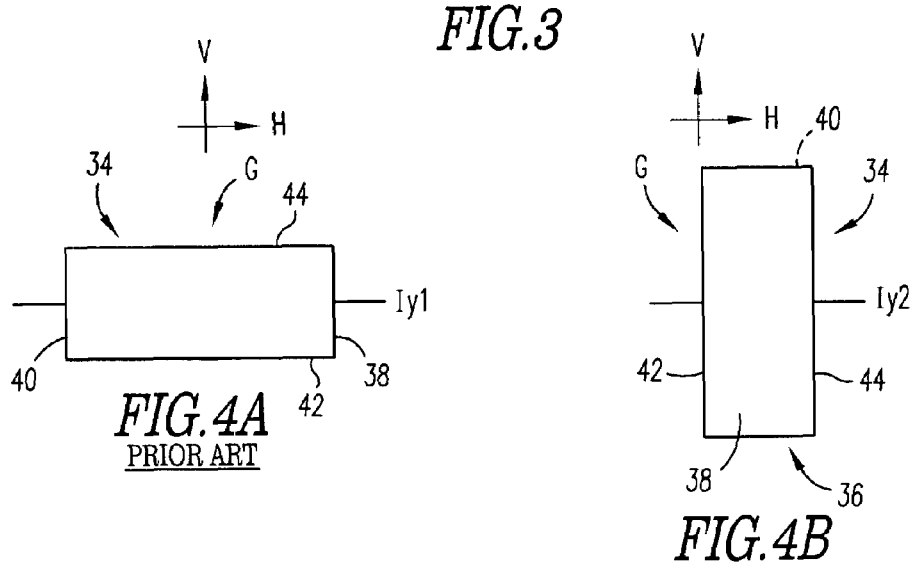
FIG.4A PRIOR ART
FIG.4B
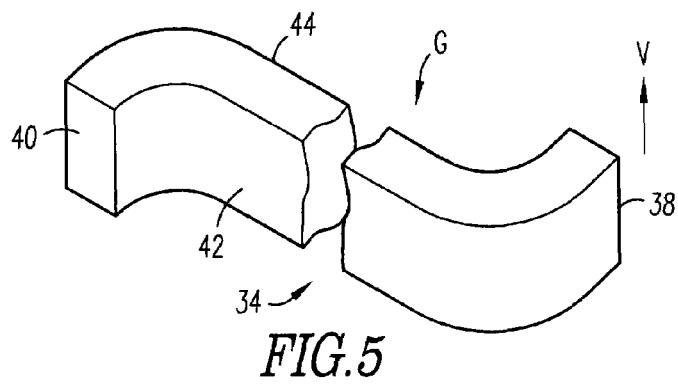
FIG.5

"I" BEAM BRIDGE INTERCONNECTION FOR ULTRA-SENSITIVE SILICON SENSOR

CROSS-REFERENCE TO RELATED APPLICATIONS

This application is related to Non-provisional application Ser. No. 11/239,275, (Northrop Grumman Ref. No. 000775-078) entitled "Focal Plane Antenna to Sensor Interface For An Ultra-Sensitive Silicon Sensor" filed on Sep. 30, 2005; Non-provisional application Ser. No. 11/239,297, (Northrop Grumman Ref.: No. 000776-078), entitled "Ultra-Sensitive Silicon Sensor Readout Circuitry" filed on Sep. 30, 2005; and Non-provisional application Ser. No. 11/240,772 (Northrop Grumman Ref.: No. 000800-078), entitled "Sensitive Silicon Sensor and Test Structure for an Ultra-Sensitive Silicon Sensor", filed on Oct. 3, 2005.

CROSS REFERENCE TO RELATED ART

This application is also related to U.S. Pat. No. 6,489,615 entitled "Ultra-Sensitive Silicon Sensor", granted to Nathan Bluzer, one of the present inventors, on Dec. 3, 2002, and assigned to the assignee of this invention. U.S. Pat. No. 6,489,615 is intended to be incorporated herein by reference for any and all purposes.

FIELD OF THE INVENTION

This invention relates generally to a bolometer type focal plane having radiation sensors for detecting thermal radiation and more particularly to the interconnecting bridge members in an ultra-sensitive silicon sensor having stages interconnected in a common plane for improving sensitivity.

DESCRIPTION OF RELATED ART

Bolometers are well known in the art and comprise devices which generate a voltage output when thermal radiation is absorbed. These devices, moreover, have been successfully used for infra-red (IR) imaging in the long wave infra-red (LWIR) band of the electromagnetic spectrum. Extending these devices to other spectral bands has proven relatively difficult in the past. However, efforts are currently under way to extend this capability to the millimeter wave (mm) and terahertz (THz) spectral bands and thus there is a need for imagers operating in the mm and THz spectral bands. Applications for such devices include, for example, multi-spectral imaging for improved navigation, target recognition and detection as well as homeland defense applications. Such applications would all greatly benefit from the use of bolometers. Therefore, realizing bolometers with acceptable performance with mm-THZ-LWIR cameras requires the formulation of new approaches for overcoming conventional limitations such as the requirement for faster response time and improved sensitivity.

In U.S. Pat. No. 6,489,615, there is disclosed, inter alia, the structure of a three tiered silicon sensor including a detector stage, an intermediate stage and a heat bath stage with the intermediate stage being located between the detector stage and the heat bath stage. The intermediate stage is also part of an electro-thermal feedback loop including an amplifier which generates heat proportional to the temperature difference between the detected temperatures provided by a pair of back-to-back temperature sensing silicon diodes respectively located in the intermediate stage and detector stage. The heat provided by the amplifier acts to actively zero the temperature difference between the detector stage and the intermediate stage so as to eliminate any net heat flow between the detector stage and the intermediate stage.

In related application Ser. No. 11/239,275 (Northrop Grumman Ref. No. 000775-078) entitled, "Focal Plane Antenna To Sensor Interface For An Ultra-Sensitive Silicon Sensor", there is disclosed both a three tiered semiconductor and a two tiered semiconductor sensor structure including three temperature stages, namely a detector stage, an intermediate stage, and a heat bath stage. In the two tiered silicon sensor, the detector stage and the intermediate stage are mutually coplanar with the upper section of the heat bath stage.

SUMMARY

It is an object of the present invention to provide an improvement in a bolometer type focal plane including a plurality of sensors, each including a detector stage, an intermediate stage and a heat bath stage. The detector stage, the intermediate stage and portion of the heat bath stage comprise stages which are generally co-planar and are interconnected so as to permit mutual co-planar rotation while preventing out of plane deflection and deformation. Interconnection between the three sensor stages is provided by elongated "I" beam type bridge members having a generally rectangular cross section including unequal relatively wider height and relatively narrower width dimensions, and wherein the bridge members are oriented such that the relatively narrower width dimension is in the direction of the common plane of the co-planar stages while the relatively wider height dimension is perpendicular thereto.

Further scope of applicability of the present invention will become apparent from the detailed description provided hereinafter. It should be understood, however, that the detailed description and specific example, while indicating the preferred embodiment of the invention, is provided by way of illustration only. Accordingly, various changes and modifications coming within the spirit and scope of the invention will become apparent to those skilled in the art from the following detailed description of the invention.

BRIEF DESCRIPTION OF THE DRAWINGS

The present invention will become more fully understood from the detailed description provided hereinafter and the accompanying drawings which are provided by way of illustration, and thus are not meant to be considered in a limiting sense, and wherein:

FIG. 3 is a top plan view generally illustrative of a two tiered semiconductor ultra-sensitive silicon sensor (with the microantenna left out for clarity) where the detector stage, intermediate stage, and heat bath stage are interconnected by bridge elements in accordance with the subject invention;

FIGS. 4A and 4B are illustrative of the prior art and desired orientation of the interconnecting bridge elements shown in FIG. 3; and FIG. 5 is a partial perspective view of the bridge elements shown in FIG. 4B.

DETAILED DESCRIPTION OF THE INVENTION

Insufficient thermal isolation in conventional bolometer type sensors is generally known and presents an ongoing problem. In order to overcome the limitation of passive thermal isolation between stages, an active thermal isolation scheme was developed by the present assignee as shown and taught, for example, in the above referenced U.S. Pat. No. 6,489,615. Overcoming these and other limitations associated with the known prior art would also result in a further improvement in responsivity. For example, increased detector responsivity would provide a large improvement in sensitivity. Also, the impact of electronic readout noise would also be reduced.

Figure 1:
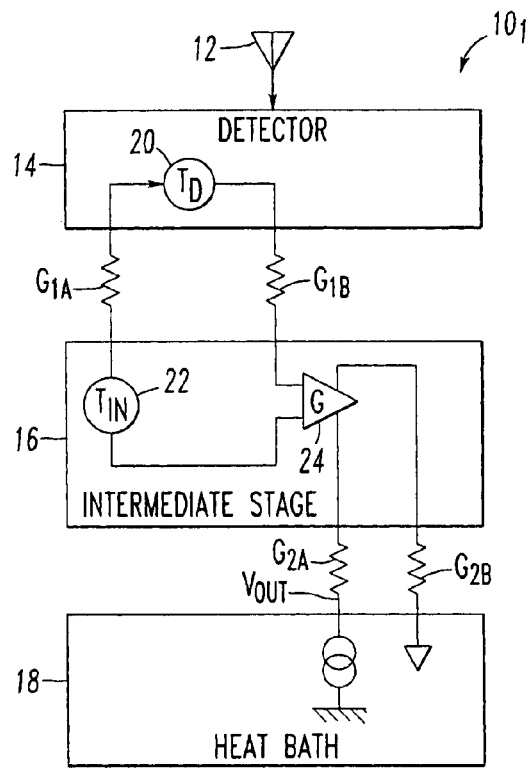
FIG. 1 is a cross section of a three tiered semiconductor ultra-sensitive silicon sensor in accordance with related art.

Referring now to the subject invention and more particularly to FIG. 1, shown thereat is an embodiment of an ultra-sensitive silicon sensor for a bolometer type focal plane including active thermal isolation as disclosed in the above-referenced related U.S. Pat. No. 6,489,615. In FIG. 1, reference numeral $10_1$ denotes a three tiered semiconductor "ultra-sensitive" bolometer pixel receiving thermal radiation directly or by means of an antenna 12 and including three major stages, a detector stage 14, an intermediate stage 16 and a heat bath stage 18. Two temperature sensors 20 and 22 are respectively located in the detector stage 14 and the intermediate stage 16 and comprise semiconductor diodes connected in back-to-back relationship to an amplifier 24, also located in the intermediate stage 16. The amplifier 24 generates heat in an electro-thermal feedback loop to zero the difference in temperature between the temperature $T_D$ of the sensor 20 in detector stage 14 and the temperature $T_{IN}$ of the sensor 22 in the intermediate stage 16 and is achieved by means of the bridge members $G_{1A}$ and $G_{1B}$ linking the detector stage 14 and the intermediate stage 16. Thus when the detector stage temperature $T_D$ changes, electro-thermal feedback causes the intermediate stage temperature $T_{IN}$ to change by the same amount. The back-to-back connection of the temperature sensors 20 and 22 produces a positive (negative) voltage signal if the detector stage 14 is at a higher (lower) temperature than the intermediate stage 16 and the temperature difference signal is amplified by the amplifier which generates heat. The thermal conductivity of these links are reduced proportionally to the reduction in the temperature difference between the detector stage 14 and the intermediate stage 16.

The intermediate stage 16 is also shown coupled to the heat bath stage via a pair of bridge members $G_{2A}$ and $G_{2B}$. Thus, the combination of the adjustable heat power with constant cooling provided by the heat bath stage 18 via the bridge members $G_{2A}$ and $G_{2B}$ provides for bi-polar temperature tracking of the detector stage 14 by the intermediate stage 16.

The implementation of a sensor shown in FIG. 1 consisting of a three tiered semiconductor device exhibits certain fabrication problems, since each one of the three tiered semiconductor sensor stages 14, 16 and 18, require the use of special wafer bonding techniques. This problem can be alleviated by resorting to a simplified two tier sensor structure $10_2$ shown in FIG. 2 where one tier includes the active components, namely, the detector stage 14 and the intermediate stage 16 and an upper section 17 of the heat bath stage 18 arranged in a common plane as shown, for example, in FIG. 3. There the solid circular detector stage 14 is surrounded by an annular intermediate stage 16. The detector stage 14 and the intermediate stage 16 are located above a planar lower section 19 of the heat bath stage 18. The upper section 17 of the heat bath stage 18 includes a generally circular cavity 28 in which is located the co-planar detector stage 14 and the intermediate stage 16. The top flat surface 21 of the heat bath section 17 is used for the placement of a generally annular antenna 12, which consists of a passive element and is readily integratable with the active sensor stages 14 and 16. When desirable, the antenna can also be placed on the intermediate stage 16.

The three stages 14, 16 and 18 of the sensor $10_2$ are typically fabricated in silicon and are interconnected by connecting bridge members made from sandwiched layers of oxide and nichrome. Given the fabrication temperature and the different thermal expansion coefficients of these materials, provisions must be made to accommodate these differences.

Figure 2:
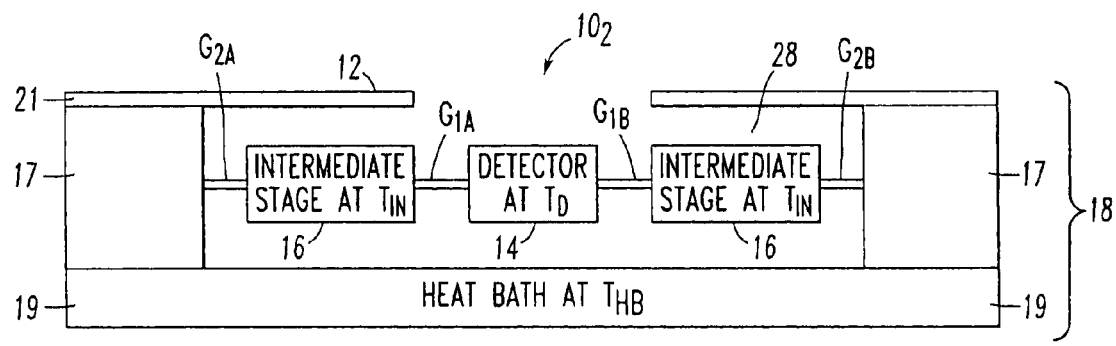
FIG. 2 is a cross section of a two tiered semiconductor ultra-sensitive silicon sensor in accordance with the related art.

This now leads to a consideration of FIGS. 3, 4A, 4B and 5 which are directed to the preferred embodiment of the invention which comprises the interconnect bridge members for the three stages 14, 16 and 18 of a sensor $10_2$ shown in FIG. 2 included in a bolometer type focal plane. As shown in FIG. 3, two sets of elongated curvilinear bridges are utilized. The first set includes two interconnecting bridges $G_{1A}$ and $G_{1B}$ for connecting the detector stage 14 with the intermediate stage 16 while the second set includes four interconnecting bridges $G_{2A}$, $G_{2B}$, $G_{2C}$ and $G_{2D}$ connecting the intermediate stage 16 with the heat bath stage 18.

The detector stage 14 in a typical embodiment of the sensor $10_2$ as shown in FIG. 3 is about 8 μm in diameter and the annular intermediate stage 16 is approximately 10 μm wide. The two gaps between these stages are typically between 3 and 4 μm wide with the interconnecting bridges $G_{1A}$, $G_{1B}$ and $G_{2A}$, $G_{2B}$, $G_{2C}$ and $G_{2D}$ being respectively located in the gaps identified by reference numerals 32 and 30.

Accommodating thermal induced stress in the interconnecting bridges $G_{1A}$, $G_{1B}$ and $G_{2A}$, $G_{2B}$, $G_{2C}$ and $G_{2D}$ is required to prevent physical distortion of the sensor structure shown in FIG. 2. Strain or stress induced distortion will normally cause out of plane deformation or canting of the detector stage 14 and/or intermediate stage 16 relative to the microantenna 12, thereby reducing the signal sensed from an external scene, not shown. Also, distortion can also cause the antenna to come in mechanical contact with stages from which it is supposed to be thermally isolated.

Thus the detector stage 14, the intermediate stage 16, and the heat bath stage 18 as shown in FIG. 2 need to be interconnected by bridge elements that accommodate strain or stress without canting or out of plane distortion. What is desired is to accommodate stress or strain in the interconnecting bridges is by in-plane rotation as opposed to out-of-plane canting. Small in-plane rotation less than about 2 μm, for example, would maintain proper alignment between the detector stage 14, and/or the intermediate stage 16 and the microantenna 12.

With respect to the two sets of elongated curvilinear interconnects $G_{1A}$, $G_{1B}$ and $G_{2A}$ . . . $G_{2D}$ of the subject invention, they have a rectangular cross section measuring about 2 μm high and 0.2 μm wide overlaid by a thin Nicrome layer of about 0.03 μm thick.

Furthermore, as shown in FIGS. 4A and 4B, all of the bridges $G_{1A}$, $G_{1B}$ and $G_{2A}$ . . . $G_{2D}$ have the same rectangular cross section with the same moments of inertia. The moment of inertia about the axis $I_{y1}$ is parallel to the wider (height) dimension 34 as shown in FIG. 4A, and the moment of inertia about the axis $I_{y2}$ is parallel to the narrower (width) dimension 36, as shown in FIG. 4B. For a given area, the moment of inertia about $I_{y1}$ is much less than that about $I_{y2}$, since the moment of inertia varies with the distance squared from the center of mass. Specifically, for a 10:1 ratio between the wider and narrower dimensions, the ratio $I_{Y2}/I_{Y1}=100$. Accordingly, the "I" beam bridge shown in FIG. 4B and 5 will be much stiffer than that shown in FIG. 4A against vertical bending in the V direction. Conversely, the "I" beam bridge shown in FIG. 4A will be much stiffer than the bridge shown in FIG. 4B against lateral or horizontal (H) bending.

Heretofore, bridges as shown in FIG. 4A have been utilized. In such a configuration, any residual strain or stress in the bridge arms will be accommodated by a vertical out of plane bending since stiffness is least in the out-of-plane H direction, i.e., perpendicular to the axis $I_{Y1}$.

By rotating the bridges G1A, G1B and G2A, G2B, G2C and G2D by 90 degrees as shown in FIG. 4B and 5, they will stiffen the bridge in the vertical (V) or out-of-plane (perpendicular to $I_{Y2}$) direction by 100 times relative to the configuration shown in FIG. 4A. Utilizing such bridge elements stiffens the structures shown in FIGS. 2 and 3 to out-of-plane movements. Thus, any contraction (stress) or expansion (strain) in the bridge lengths will be accommodated by in-plane length changes manifesting themselves by relative co-planar rotation between the detected stage 14, the intermediate stage 16, and the heat bath stages 18 and 26 shown in FIG. 3. Rotation does not produce out-of-plane distortion thereby maintaining electrical coupling and mechanical isolation between the antenna and detector stage, and intermediate stage (if the microantenna is not placed there). Providing means for alleviating stress and/or strain by rotation (and not by out-of-plane distortion) is very important since fabrication of these small structures and temperature changes always include stress and/or strain. Controlling stress/strain by fabrication techniques is very difficult and it is much more practical to provide means for mechanical relief by rotation.

Accordingly, the "I" beam approach shown in FIG. 4B and 5 for the interconnecting bridges between the detector, intermediate and heat bath stages 14, 16 and 18 provides one with the flexibility of optimizing the structural features of the silicon sensor $10_2$ without worry of vertical out-of- plane distortion due to mechanical stresses or strains in the film because the geometry and orientation of the bridges $G_{1A}$, $G_{1B}$ and $G_{2A} \ldots G_{2D}$ is used to stiffen the bridge elements in the vertical direction while accommodating the stress and strain by in-plane rotation.

This same type of bridge member structure can be used in connection with MEMS devices.

Having thus described the preferred embodiment of the invention, any variations therefrom are not to be regarded as a departure from the spirit and scope of the invention nor for applications including other sensors where MEMS like structures are required that are tolerant to strain and stress. Thus all such modifications as would be obvious to one skilled in the art are intended to be included within the scope of the following claims.

The invention claimed is:

1. A bridge member for a MEMS device, comprising:
at least two elongated, curvilinear bridge members, non-overlapping a length direction and designed to accommodate stress and/or strain and interconnecting coplanar elements of a MEMS device, and wherein the bridge members have a cross section comprising tow unequal dimensions and wherein a larger dimension of said two unequal dimensions is substantially perpendicular to a common plane of said MEMS devices so as to permit mutual rotation of said elements in said common place while inhibiting out of plane deformation.

2. A bridge member according to claim 1 wherein the MEMS device comprises a sensor.

3. A bridge member according to claim 2 wherein the sensor comprises a bolometer type sensor.

4. A bolometer type sensor, comprising:
a plurality of coplanar sensor stages;
at least two elongated, curvilinear bridge members, designed to accommodate stress and/or strain and having mutually adjacent non-overlapping end portions interconnecting the sensor stages within a sensor, wherein the bridge members have a cross section comprising two unequal dimensions, a wider dimension and a narrower dimension, and wherein the wider dimension is substantially transverse to a common plane of the coplanar sensor stages and the narrower dimension is in the direction of the common plane of the sensor stages.

5. A sensor according to claim 4 wherein the bridge members have a predetermined length, and wherein opposite ends of the bridge members are connected between said sensor stages so as to accommodate stress and/or strain by mutual rotation therebetween while restricting out of plane deformation between adjacent sensor stages.

6. A sensor according to claim 5 wherein said at least two bridge member comprise three or more bridge members.

7. A sensor according to claim 6 wherein said sensor stages include two adjacent stages and wherein one sensor stage of said two adjacent sensor stages is located in a central opening of the other sensor stage.

8. A sensor according to claim 7 wherein said central opening comprises a generally circular opening, and wherein said one sensor stage includes a circular perimeter.

9. A sensor according to claim 8 wherein the cross-section of the bridge member comprises a generally rectangular cross section and wherein the wider dimension is the height dimension and the narrower dimension is the width dimension.

10. A sensor according to claim 9 wherein the ratio of the height to width dimension of the bridge member is about 10:1.

11. A sensor according to claim 8 wherein said one sensor stage including a circular perimeter comprises a detector stage, the other sensor stage comprises an annular intermediate stage including said central opening in which is located said detector stage, and additionally including an outer stage having a central opening in which is located the said annular intermediate stage, thereby providing a three stage sensor, and one or more of said bridge members of a predetermined length and cross-section connected between said detector stage and said annular intermediate stage and one or more bridge members of predetermined length and cross-section connected between said annular intermediate stage and said outer heat bath stage, and wherein the bridge members are oriented so as to permit relative in-plane rotation therebetween while restricting out of plane deformation.

12. A sensor according to claim 11 wherein said cross-section of said bridge members comprises a generally rectangular cross-section having a relatively wider dimension and a relatively narrower dimension.

13. A sensor according to claim 12 and where the relatively narrower dimension is parallel the common plane of the sensor stages.

14. A sensor according to claim 13 wherein the bridge members have a wider dimension to narrower dimension ratio of about 10:1.

15. A sensor according to claim 13 wherein said two or more bridge members between said outer and annular intermediate stages comprise four bridge members, and wherein said one or more bridge members between said annular intermediate stage and said detector stage comprise two bridge members.

16. A sensor accordingly to claim 15 wherein said stages include generally flat surfaces.

17. A sensor according to claim 16 wherein said stages comprise three stages including an outer heat bath stage, an intermediate stage, and an inner detector stage.

18. A sensor according to claim 17 wherein said bridge members comprise active thermal links between the stages for increasing sensitivity by providing electro-thermal feedback between the detector stage and the intermediate stage so as to provide a substantially zero temperature difference therebetween.

19. A bolometer type focal plane including a plurality of sensors, wherein each sensor comprises:

a plurality of coplanar sensor stages;

at least two elongated curvilinear bridge members, designed to accommodate stress and/or strain and having mutually adjacent non-overlapping end portions interconnecting the sensor stages within a sensor, wherein the bridge members have a cross section comprising two unequal dimensions, a wider dimension and a narrower dimension, and wherein the wider dimension is substantially transverse to a common plane of the coplanar sensor stages and the narrower dimension is in the direction of the common plane of the sensor stages so as to permit sensor rotation in said common plane while restricting out of the plane deflection.

* * * * *